United States Patent [19]
Cash

[11] 3,913,103
[45] Oct. 14, 1975

[54] DEVICE FOR RANGE CUT-OFF BY FREQUENCY SELECTION IN MULTIPLE MODULATION FUZES

[75] Inventor: Carlton H. Cash, Norco, Calif.

[73] Assignee: The United States of America as represented by the Secretary of the Navy, Washington, D.C.

[22] Filed: Jan. 27, 1959

[21] Appl. No.: 789,459

[52] U.S. Cl. .................................. 343/7 PF; 343/14
[51] Int. Cl.² .............................................. G01S 9/39
[58] Field of Search............. 343/7, 12, 14, 7 PF, 10

[56] References Cited
UNITED STATES PATENTS
2,691,776  10/1954  Brandon ................................ 343/14
2,907,023  9/1959  Skinner.................................. 343/14

Primary Examiner—Malcolm F. Hubler
Attorney, Agent, or Firm—Richard S. Sciascia; Joseph M. St.Amand; T. M. Phillips

EXEMPLARY CLAIM

1. A radio fuze system comprising means for providing a signal frequency modulated by at least two separate frequencies, means for transmitting said signal, means for receiving a return signal from a target, a mixing circuit having first and second inputs coupled to said transmitting and receiving means respectively for producing an output signal comprising a spectrum of coherent Doppler wave portion plus an incoherent wave portion due to range noise, and spectral comparison circuit means coupled to the output of said mixing circuit for producing an output signal in response to the output signal of said mixing circuit when the energy level of the coherent Doppler wave portion of said output signal is of a predetermined amount greater than the incoherent portion of said output signal.

3 Claims, 10 Drawing Figures

INVENTOR.
CARLTON H. CASH

DEVICE FOR RANGE CUT-OFF BY FREQUENCY SELECTION IN MULTIPLE MODULATION FUZES

The invention described herein may be manufactured and used by or for the Government of the United States of America for governmental purposes without the payment of any royalties thereon or therefor.

This invention relates to a radio fuze system and more particularly to a FM/CW fuze system utilizing multiple modulation of the RF carrier signal to achieve desirable absolute range cut-off whereby the fuze has ability to completely discriminate against targets that are greater than a desired fixed distance from the fuze and to "See" in-range targets in the presence of large return signals from out-of-range objects.

In the prior FM/CW fuze systems a single sinusoidal frequency modulation has been utilized to give some range attenuation but the cutoff is very poor and ambiguous due to the periodic modulation. Other systems include multiple modulation signals such as double sine wave modulation, sine wave plus noise, and sine wave plus triangular waves, however, these systems have certain limitations such as incomplete range discrimination between in-range and out-of-range targets, susceptable to counter measures and did not have an absolute range cut-off.

The fuze system of the present invention comprises an FM signal, frequency modulated by both a periodic wave and band limited noise, a mixer for mixing part of the modulated FM signal with a return echo signal from a target and means for amplifying and comparing the spectral distribution of the energy output of the mixer to provide a firing signal when targets are in range.

It is an object of the invention, therefore, to provide a radio fuze system having an absolute range cut-off characteristic.

It is a further object of the invention to provide a fuze system having good counter measures resistances.

Another object of the invention is to provide a fuze that is non-responsive to out-of-range targets regardless of size.

Another object of the invention is to provide a radio fuze system which completely discriminates against targets that are greater than a desired fixed distance.

A still further object of the present invention is to provide a radio fuze system responsive to in-range targets in the presence of large return signals from out-of-range objects.

Another object of the invention is to provide a fuze system which can be utilized in close proximity to a surface such as the ocean without receiving spurious signals from sea return which will trigger the fuze prematurely.

Other objects and many of the attendant advantages of this invention will be readily appreciated as the same becomes better understood by reference to the following detailed description when considered in connection with the accompanying drawings wherein:

Figure 1:
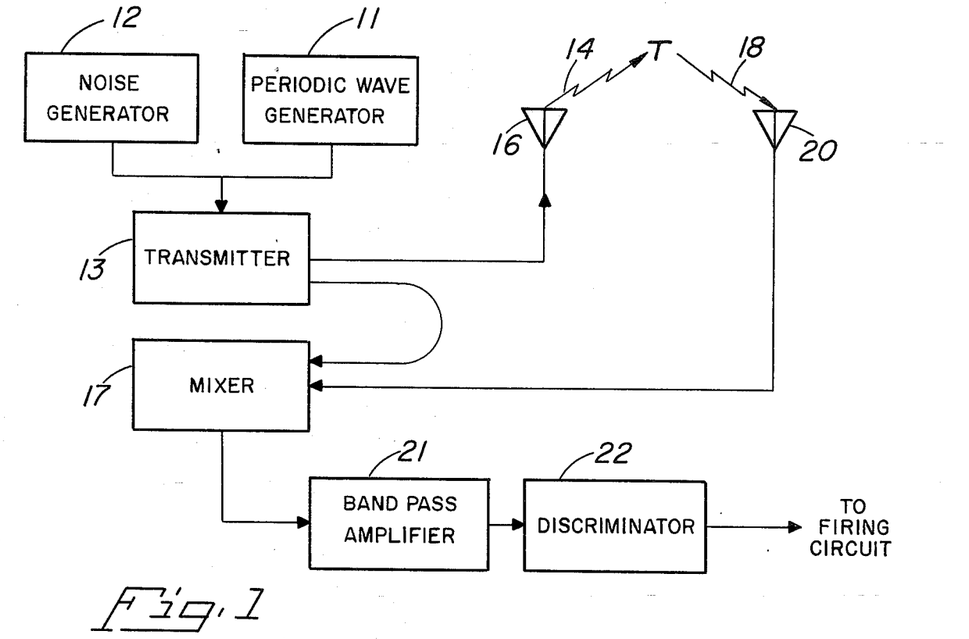
FIG. 1 is a block diagram illustrating one preferred embodiment of the present invention.

Referring now more particularly to the drawings wherein one preferred embodiment of the present invention is shown in block diagram in FIG. 1, the fuze is assumed to be mounted in a moving missile (not shown) which is guided on a path to approach the target with the RF energy from the fuze being transmitted toward the target and a return echo signal being received therefrom. In the block 11 a periodic wave in any desired form such as a sine or triangle wave is generated while a band of white noise is generated in block 12. The output from the periodic wave generator 11 and noise generator 12 are used to frequency modulate the transmitter 13, which in turn transmits a frequency modulated RF carrier signal 14 in the direction of the target "T" through the antenna 16. A portion of the transmitted energy from the transmitter 13 is also applied to the mixer 17 where it is combined with the return signal 18 from the target which has been modified by the Doppler effect due to the relative movement between the missile and target and is received through the antenna 20 and applied to the mixer 17. The system thus described is the same in all of the disclosed embodiments of the present invention and the output of the mixer 17 in all of the embodiments wherein a sine wave is used as the periodic wave can best be described as follows:

The spectrum of the output from the mixer 17 of the noise plus sine wave modulated fuze systems consist of coherent and incoherent signals. The coherent portions of the mixer output is in the form of $$\frac{E^2}{2} J_n^2 \left(2\beta \sin \frac{\Omega \tau}{2}\right) \exp(-D^2 \tau^2)$$

where $\beta = \Delta F/f_m$ = modulation index of sine wave modulation.

$\Omega$ = angular frequency of sine wave modulation.

$D$ = RMS angular frequency deviation to noise modulation signal.

$\tau$ = time delay.

$J_n$ = Bessel function of the first kind order $n$.

The frequency components of this coherent signal are located at harmonics $n\Omega$ of the modulating sine wave. The incoherent portion of the mixer output (sometimes known as range noise) is best shown in the form $$\frac{E^2}{2} \frac{J_n{}^2 \; (2\beta \sin \frac{\Omega\tau}{2})}{[2/3 \; \pi(\beta^2+B_1B_1+B_2{}^2)]^{1/2} \; D\tau} \; \exp \left[\frac{-3\;\sigma^2}{2D^2\tau^2(B_1{}^2+B_1B_2+B_2{}^2)}\right]$$

and is centered about each harmonic $n\Omega$ of the modulating sine wave. Where, $B_1$ and $B_2$ = the lower and upper angular frequency limits of the noise respectively and $\sigma$ = the frequency separation from $n\Omega$.

Figure 6:
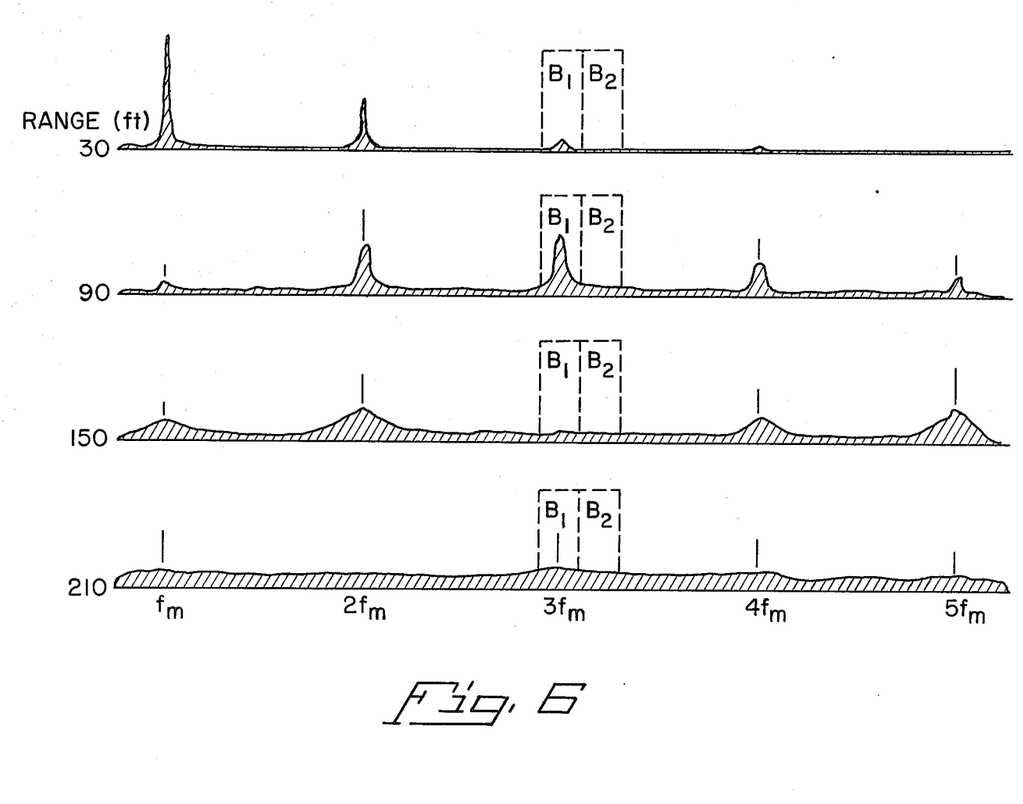
FIG. 6 is a diagram illustrating a typical mixer output for a periodic wave plus noise modulated fuze system.

FIG. 6 illustrates the spectral distribution of the energy in a portion of the mixer output spectrum at various ranges with particular references to the third harmonic ($3fm$). It can be seen that at the lower fuzing ranges of 30 and 90 feet the energy in the bands $B_1$ and $B_2$ is concentrated mostly in the lower angular frequency limit $B_1$ but at the other greater ranges shown the energy is nearly evenly distributed between the two hands. For ranges greater than the largest shown in FIG. 6 the distribution becomes even more uniform. The $B_1$ band comprises both the coherent and incoherent portion of the mixer signal and it will be referred to as the Doppler band, hereinafter, while band $B_2$ which comprises only the incoherent portion of the mixer output and is compared in some manner with the doppler band is hereinafter referred to as the comparison band.

Referring again to the embodiment shown in FIG. 1 the band pass amplifier 21 has sufficient bandwidth to support both the Doppler band and comparison band and is at least four times the largest expected doppler frequency (4W). The center frequency is adjusted midway between the doppler band $B_1$ and the comparison band $B_2$.

The frequency discriminator 22 is designed so that signals appearing in the Doppler band $B_1$ or low frequency signals passed by the amplifier 21 will give an output of the opposite polarity to the signals from the amplifier 21 that appear in the high frequency or comparison band $B_2$.

Figure 2:
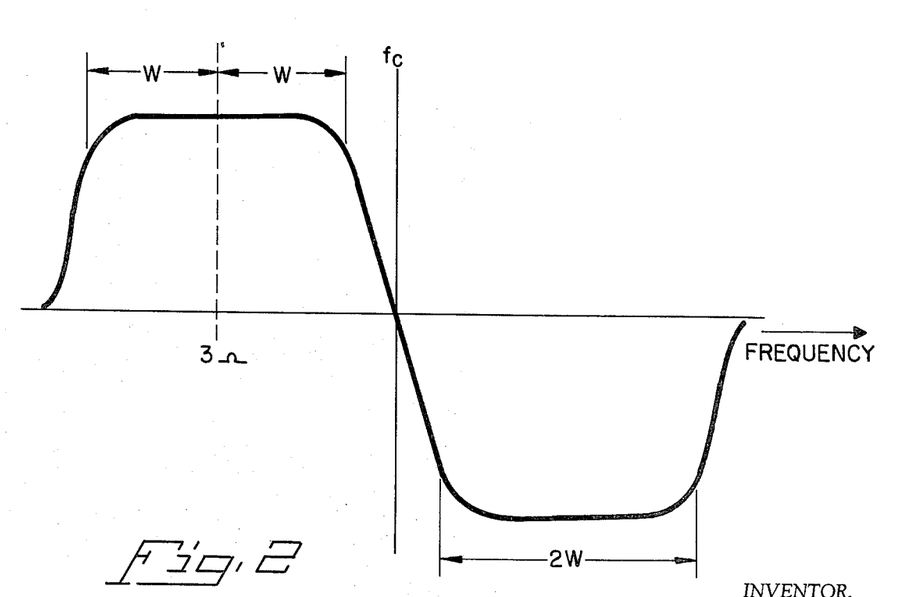
FIG. 2 is a diagram illustrating a frequency response curve of the amplified mixer output and comparing the doppler band with the comparison band.

With particular reference to FIG. 2 which shows a frequency response curve of the amplifier 21 discriminator 22 combination the Doppler band for example appears on the left of the center frequency $f_c$ of the amplifier 21. Therefore, when the signals appearing in both bands $B_1$ and $B_2$ simultaneously are balanced no output from the discriminator 22 is obtained to fire the fuze. In FIG. 2 $3\Omega$ is the third harmonic of the modulation frequency and W is the highest Doppler frequency to be received. The frequency content of the signals from targets in range will be concentrated in the $3\;\Omega\;\pm\;W$ and will therefore give an output from the discriminator. However, the frequency content from targets at large ranges will be distributed evenly between the two bands and will result in no output from the discriminator. This means that the frequency discriminator 22 can be set so that a relatively small addition of Doppler signal from a close in intercept will cause the fuze to fire in the presence of large returns from a far-target such as sea return.

Figure 3:
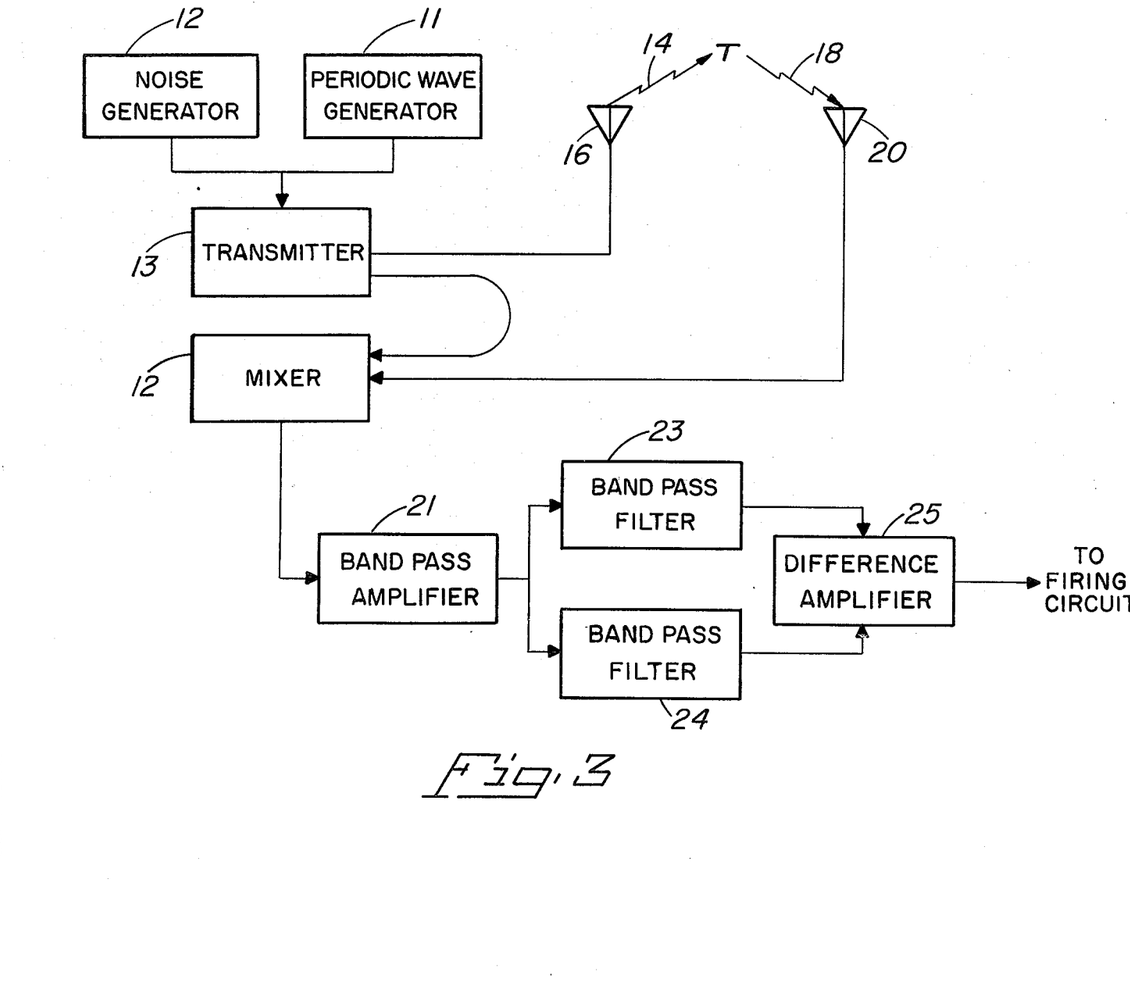
FIG. 3 is a block diagram of a second preferred embodiment of the present invention.
Figure 4:
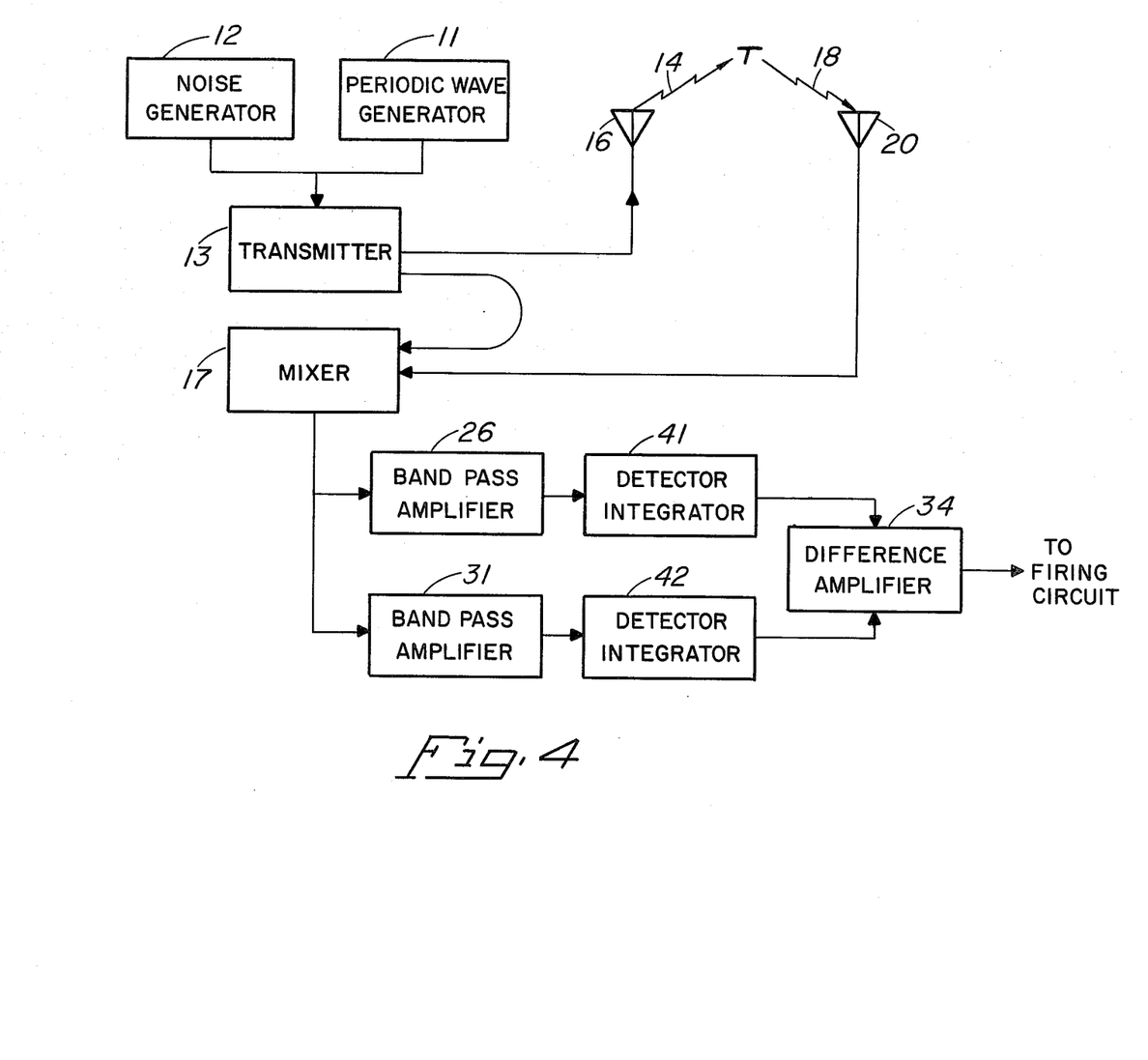
FIG. 4 is a block diagram of a third preferred embodiment of the present invention.

The second preferred embodiment illustrated in FIG. 3 is the same as the embodiment illustrated in FIG. 1 up through the band pass amplifier 21. However in this species of the present invention the output from the band pass amplifier 21 is passed through a low pass filter 23 and a high pass filter 24 and the output from the filters 23 and 24 are passed to a difference amplifier 25.

The low pass filter 23 has a frequency response from twice the lowest expected doppler frequency to twice the highest expected Doppler frequency and would thus pass the $B_1$ (Doppler) band. The frequency response of the high pass filter 24 is twice the highest expected Doppler frequency to at least four times the highest expected Doppler frequency and would thus pass band $B_2$ (comparison band). The output from the difference amplifier 25 is again dependent upon whether the targets are in-range or out-of-range as in the embodiment shown in FIG. 1. If the target is in-range the amplitude of the comparison band $B_2$ passed by the high pass filter 24 will be much lower in amplitude than the signal passed by the low pass filter 23 and there will be a firing signal output from the difference amplifier 25. However, for targets beyond the fuzing range the frequency distribution from the band pass amplifier 21 is uniform and there will be equal signal amplitudes in both filters 23 and 24. This will result in no signal output to the firing circuit from the difference amplifier 25.

With particular reference to FIGS. 4, 7, 8 and 9 it can be shown that for small $D\tau$ the incoherent portion of the mixer 17 output will be in the form $$\frac{E^2}{2} \frac{J_n{}^2 \; (2\beta \sin \frac{\Omega\tau}{2})D^2\tau^2}{2(B_2-B_1)} \; \exp\;[-D^2\tau^2]$$

for $n\Omega + B_1 < \sigma < n\Omega + B_2$ and Zero elsewhere.

By putting a band pass amplifier (amplifier 26 in FIG. 4) on the mixer 17 output which passes $3\;\Omega\;\pm\;W$ known as the $J_3$ Doppler band, frequency components of the mixer signal results in a band of the coherent and a band of the incoherent signal being amplified. The resultant output from the amplifier is the RMS sum of the two components. It can be shown that for large $D\;\tau$ this takes the form $$P\;out = \frac{E^2}{2}J_3{}^2(\alpha)\;\exp\;(-D^2\tau^2)$$

$$+ \frac{E^2}{2} \frac{1}{[2/3\;\pi(B_1{}^2+B_1B_2+B_2{}^2)]^{1/2}D\tau} \left\{ \begin{array}{l} 2J_3{}^2\;(\alpha)\int_0^W \exp\left[\frac{-3\sigma^2}{2D^2\tau^2(B_1{}^2+B_1B_2+B_2{}^2)}\right]d \\ + J_2{}^2(\alpha)+J_4{}^2(\alpha) \int_{\Omega-w}^{\Omega+w} \exp\left[\frac{-3\sigma^2}{2D^2\tau^2(B_1{}^2+B_1B_2+B_2{}^2)}\right]d \\ + \left[ J_1{}^2(\alpha)+J_5{}^2(\alpha) \right] \int_{2\Omega-w}^{2\Omega+w} \exp\left[\frac{-3\sigma^2}{2D^2\tau^2(B_1{}^2+B_1B_2+B_2{}^2)}\right]d \\ + \ldots \end{array} \right.$$

where $\alpha = 2\beta \sin \Omega\tau/2$ and the first term represents the coherent portion of the power and the other the incoherent portion. and for small $D\tau$:

$$P\;out \cong \frac{E^2}{2}J_3{}^2(\alpha)\;\exp\;(-D^2\tau^2)$$

Figure 7:
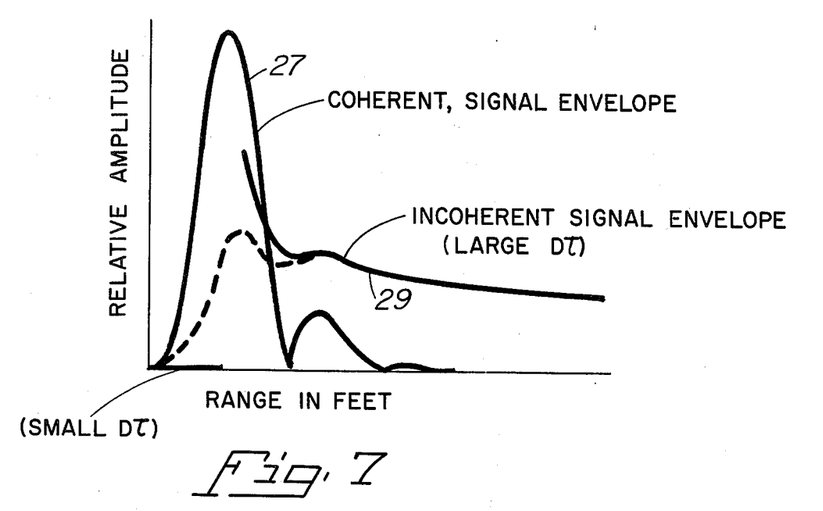
FIG. 7 is a diagram illustrating the coherent and incoherent signal components in a doppler band from the mixer output of a FM fuze system.
Figure 8:
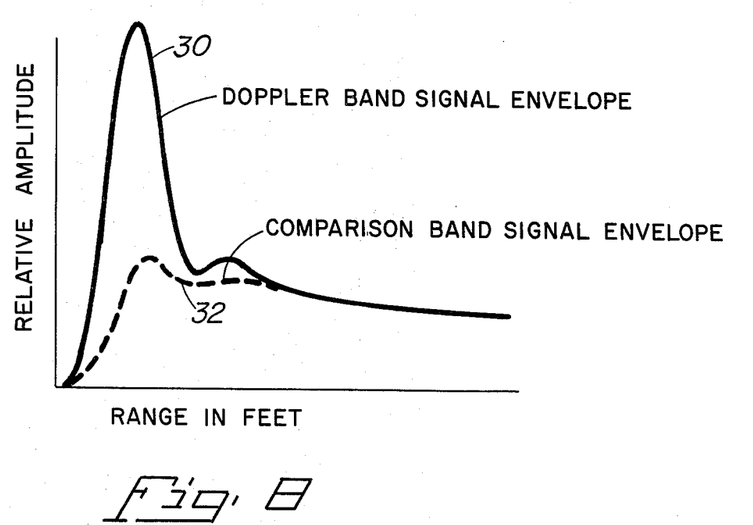
FIG. 8 is a diagram illustrating the doppler band and comparison band envelopes of a detected mixer output of a FM fuze system.

FIG. 7 shows the coherent 27 and the incoherent 29 signal envelopes in the Doppler band wherein the dotted line portion is the sum of the large and small $D\tau$ incoherent output envelope. The total power output in this doppler band $B_1$ is the RMS sum of the coherent and incoherent signals 27 through 29 from the detector integrator 41 and is shown as curve 30 in FIG. 8. A second band pass amplifier 31 on the mixer 17 output which passes $3\Omega + w$ to $3\Omega + 3w$ (comparison band $B_2$) will not pass any coherent portion of the mixer signal. However an incoherent signal (comparison band $B_2$) will be passed as determined by $$P\text{ out} = \frac{E^2}{2} \frac{1}{[2/3\ \pi(B_1^2+B_1B_2+B_2^2)]^{1/2}D\tau} \left\{ \begin{array}{l} J_3^2(\alpha)\int_w^{3w}\exp\left[\frac{-3\sigma^2}{2D^2\tau^2(B_1^2+B_1B_2+B_2^2)}\right]d\sigma \\ +J_2^2(\alpha)\int_{\Omega+w}^{\Omega+3w}\exp\left[\frac{-3\sigma^2}{2D^2\tau^2(B_1^2+B_1B_2+B_2^2)}\right]d\sigma \\ +J_4^2(\alpha)\int_{\Omega-w}^{\Omega-3w}\exp\left[\frac{-3\sigma^2}{2D^2\tau^2(B_1^2+B_1B_2+B_2^2)}\right]d\sigma \\ +J_1^2(\alpha)\int_{2\Omega+w}^{2\Omega+3w}\exp\left[\frac{-3\sigma^2}{2D^2\tau^2(B_1^2+B_1B_2+B_2^2)}\right]d\sigma \\ +J_5^2(\alpha)\int_{2\Omega-w}^{2\Omega-3w}\exp\left[\frac{-3\sigma^2}{2D^2\tau^2(B_1^2+B_1B_2+B_2^2)}\right]d\sigma \\ +\ldots \end{array} \right.$$

and for a normalized signal output this comparison band envelope from the detector integrator 42 [$B_2$] is plotted as curve 32 in FIG. 8.

Figure 9:
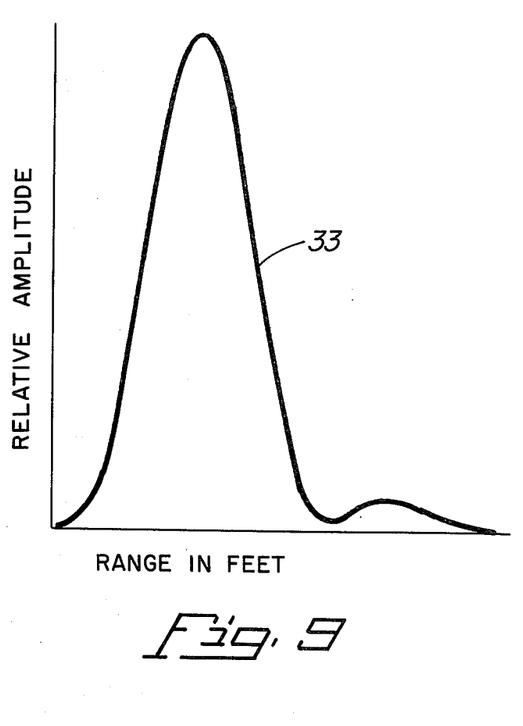
FIG. 9 is a diagram illustrating the difference in energy between the doppler band envelope and comparison band envelope shown in FIG. 8.

As shown in FIG. 8 for near ranges there is a large difference between the output from the two band pass amplifiers 26–31 and for large ranges the two outputs become essentially equal. FIG. 9 is a plot 33 of the difference (Doppler band minus comparison band) of the envelopes of the two signals passed to the difference amplifier 34 shown in FIG. 4 and is the output from the difference amplifier 34. By setting the gain of the amplifier 31 slightly higher than the gain of amplifier 26 the output from the difference amplifier 34 for small ranges will be relatively large and positive while the output for large ranges relatively small and even negative if the difference in gain is set high enough. Therefore, when the firing signal is designed to trigger from positive signals only, absolute range cut-off can be obtained and the effects of the negative signals at large ranges will have no effect on target intercepts in-range in the presence of a far-range target.

Figure 5:
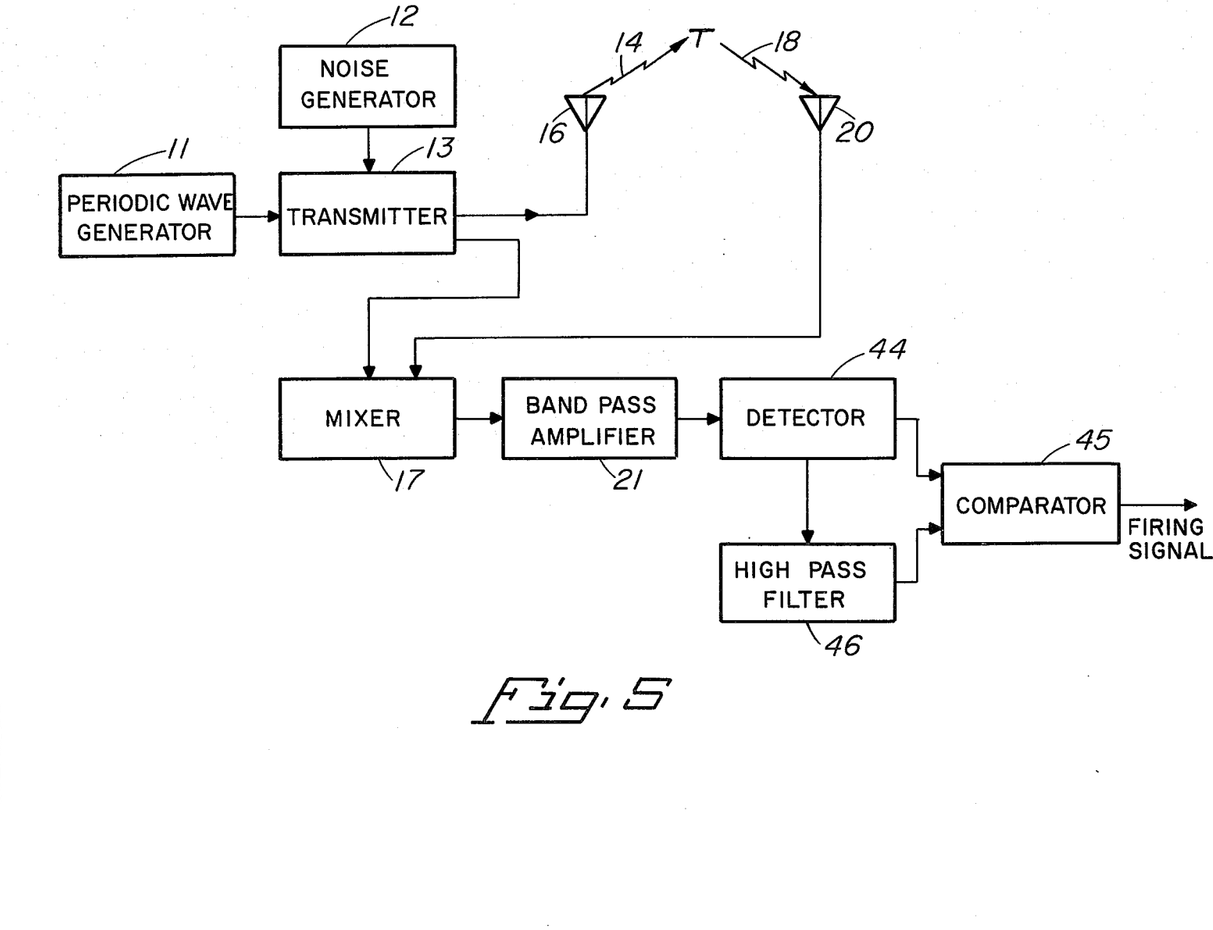
FIG. 5 is a block diagram of a fourth preferred embodiment of the present invention.

FIG. 5 illustrates another system wherein all of the signals from the mixer output are rejected when the frequency components of the signal outside the normal doppler band $B_1$ (referred to as the comparison band $B_2$ above) become a certain predetermined percentage of the total signal whereby the fuze will not respond to any target at a range greater than a fixed distance but will still respond to a close-in target in the presence of these signals from a far-target.

The output from the mixer 17 is passed through a band pass amplifier 21 which (as noted in the description above of the system shown in FIG. 1) is of sufficient bandwidth to pass on to the detector 44 both the Doppler band signals and the comparison band signals which would be a width equal to four times the expected Doppler frequency. The detector 44 output comprises both the envelopes of the Doppler band signals and the envelope of the comparison band and is fed directly into the comparator 45 circuit and the high pass filter 46. If there are no comparison band signals of significant amplitude passed from the filter 46 to the comparator (as will be the case when a close in target is intercepted) the comparator will cause fuze firing. However, the comparator circuit is set such that if there are signals of sufficient amplitude in the high pass or comparison band equal to a predetermined percentage of the amplitude of the envelope of the complete band passed by the detector 44 this comparison band signal enters the comparator via the high pass filter 46 and prevents an output of a firing signal from the comparator circuit.

Figure 10:
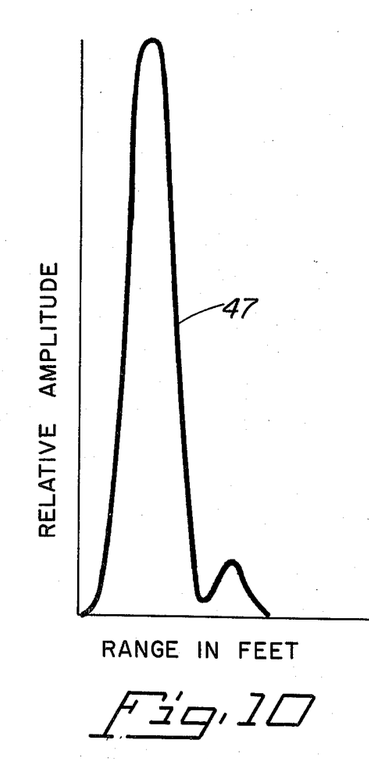
FIG. 10 is a diagram illustrating the difference between the doppler band envelope and comparison band envelope of a fuze system having a higher modulation index for the periodic modulating wave than the system of FIG. 9.

The range response of any of the above described systems can be appreciably adjusted over a large range by changing the amplitude of the periodic wave modulation (modulation index) together with a change in the noise amplitude without changing the frequency of the periodic wave or the band width of the noise. For example in FIG. 9 the modulation index ($\beta$) of the periodic wave is 6.0 and the RMS angular frequency deviation due to noise modulation signal is 1 Mc while for the range curve 47 shown in FIG. 10 the modulation index of the periodic wave has been increased to 13 and the (D) of the noise amplitude has been increased to 2 Mc. As can readily be seen the difference amplifier output in FIG. 10 peaks at a closer range with a higher amplitude and has a sharper range cutoff. The significance of this versatility is that the range response characteristic can be changed by simply throwing a switch which changes the amplitude of the periodic wave and noise modulations. Thus the type of range response desired of the fuze can be selected while the missile is on the launcher and it is feasible to use the same fuze against air or ground targets.

The above disclosed fuze systems of band comparison of a noise plus periodic wave modulation thus are capable of completely suppressing responses from far range targets by obtaining absolute range cutoff at a desired range. Furthermore, the countermeasures resistance of all the systems is considerably greater than the prior radio fuze systems because any counter measure signal at the mixer 17 output will be essentially the same as a far-range target signal and will therefore be balanced out by any of the described circuits receiving the mixer output.

Obviously many modifications and variations of the present invention are possible in the light of the above teachings. It is therefore to be understood that within the scope of the appended claims the invention may be practiced otherwise than as specifically described.

What is claimed:

1. A radio fuze system comprising means for providing a signal frequency modulated by at least two separate frequencies, means for transmitting said signal, means for receiving a return signal from a target, a mixing circuit having first and second inputs coupled to said transmitting and receiving means respectively for producing an output signal comprising a spectrum of coherent Doppler wave portion plus an incoherent wave portion due to range noise, and spectral comparison circuit means coupled to the output of said mixing circuit for producing an output signal in response to the output signal of said mixing circuit when the energy level of the coherent Doppler wave portion of said output signal is of a predetermined amount greater than the incoherent portion of said output signal.

2. An FM fuze system comprising a first source of periodic waves, a second source of band limited white noise, means for simultaneously frequency modulating a carrier frequency with signals from said first and second sources, means for transmitting the frequency modulated signal provided by said last-mentioned means, means for receiving said frequency modulated signal reflected from a target, a mixing circuit having first and second inputs coupled to said transmitting and receiving means respectively for producing an output signal having a balanced spectrum of coherent Doppler wave portion and incoherent wave portion when said target is out of range and for producing an output signal having an unbalanced spectrum with the amplitude of the coherent Doppler wave portion being greater than the incoherent wave portion, and circuit means coupled to said mixing circuit for amplifying and comparing the spectral distribution of the energy output of the mixing circuit to produce a firing signal in response to the unbalanced condition thereof.

3. An FM fuze system responsive to in-range targets in the presence of large return signals from out-of-range objects comprising means for providing a signal frequency modulated by at least two separate frequencies, means for transmitting said signal, means for receiving the return echo of said signal modified by the relative movement between the fuze and a target, a mixing circuit having first and second inputs coupled to said transmitting and receiving means respectively for producing an output signal comprising a spectrum of coherent Doppler wave portion plus an incoherent wave portion due to range noise, a band pass amplifier coupled to the output of said mixing circuit having a band width sufficient to pass said Doppler wave portion and said incoherent wave portion of said output signal, and a frequency discriminating means coupled to said amplifier for producing a firing signal when the sum of the energy of the Doppler wave portion and the energy of the incoherent wave portion is greater by a predetermined amount than the energy level of said incoherent wave portion of said output signal.

* * * * *